(12) United States Patent
Lin et al.

(10) Patent No.: US 11,507,800 B2
(45) Date of Patent: Nov. 22, 2022

(54) SEMANTIC CLASS LOCALIZATION DIGITAL ENVIRONMENT

(71) Applicant: Adobe Inc., San Jose, CA (US)

(72) Inventors: Zhe Lin, Fremont, CA (US); Yufei Wang, Mountain View, CA (US); Xiaohui Shen, San Jose, CA (US); Scott David Cohen, Sunnyvale, CA (US); Jianming Zhang, Campbell, CA (US)

(73) Assignee: ADOBE INC., San Jose, CA (US)

( * ) Notice: Subject to any disclaimer, the term of this patent is extended or adjusted under 35 U.S.C. 154(b) by 1250 days.

(21) Appl. No.: 15/913,829

(22) Filed: Mar. 6, 2018

(65) Prior Publication Data

US 2019/0279074 A1 Sep. 12, 2019

(51) Int. Cl.
*G06T 7/10* (2017.01)
*G06F 16/583* (2019.01)
*G06N 3/04* (2006.01)
*G06N 20/00* (2019.01)

(52) U.S. Cl.
CPC ......... *G06N 3/0454* (2013.01); *G06F 16/583* (2019.01); *G06N 3/0481* (2013.01); *G06N 20/00* (2019.01); *G06T 7/10* (2017.01); *G06T 2207/20081* (2013.01); *G06T 2207/20084* (2013.01); *G06T 2210/12* (2013.01)

(58) Field of Classification Search
None
See application file for complete search history.

(56) References Cited

U.S. PATENT DOCUMENTS

| 9,818,048 | B2 | 11/2017 | Kiapour et al. |
| 2015/0324392 | A1 | 11/2015 | Becker et al. |
| 2016/0140519 | A1 | 5/2016 | Trepca et al. |
| 2017/0061250 | A1 | 3/2017 | Gao et al. |
| 2017/0124432 | A1 | 5/2017 | Chen et al. |
| 2017/0278289 | A1* | 9/2017 | Marino ................... G06T 11/60 |
| 2017/0330059 | A1 | 11/2017 | Novotny et al. |
| 2018/0039853 | A1* | 2/2018 | Liu ....................... G06V 10/462 |
| 2018/0060701 | A1 | 3/2018 | Krishnamurthy et al. |
| 2019/0294641 | A1 | 9/2019 | Alexeev et al. |

(Continued)

FOREIGN PATENT DOCUMENTS

| CN | 108984745 | 12/2018 |
| GB | 2546369 | 7/2017 |

OTHER PUBLICATIONS

"Combined Search and Examination Report", GB Application No. 1900596.6, dated Jul. 9, 2019, 5 pages.

(Continued)

*Primary Examiner* — Idowu O Osifade

(74) *Attorney, Agent, or Firm* — F. Chau & Associates, LLC

(57) ABSTRACT

Semantic segmentation techniques and systems are described that overcome the challenges of limited availability of training data to describe the potentially millions of tags that may be used to describe semantic classes in digital images. In one example, the techniques are configured to train neural networks to leverage different types of training datasets using sequential neural networks and use of vector representations to represent the different semantic classes.

20 Claims, 9 Drawing Sheets

(56) References Cited

U.S. PATENT DOCUMENTS

2020/0380298 A1 12/2020 Aggarwal et al.
2021/0089827 A1 3/2021 Kumagai et al.

OTHER PUBLICATIONS

Mikolov, "Efficient estimation of word representations in vector space", arXiv preprint arXiv:1301.3781 (2013), Sep. 7, 2013, 12 pages.
"Foreign Office Action", AU Application No. 2019200270, dated Jul. 30, 2021, 7 pages.
Hou, "Deeply Supervised Salient Object Detection with Short Connections", Jan. 24, 2018, 14 pages.
Li, "Fully Convolutional Instance-aware Semantic Segmentation", Apr. 10, 2017, 9 pages.
Szegedy, "Rethinking the Inception Architecture for Computer Vision", Dec. 11, 2015, 10 pages.
Office Action dated Sep. 22, 2022 in related U.S. Appl. No. 17/186,625.

\* cited by examiner

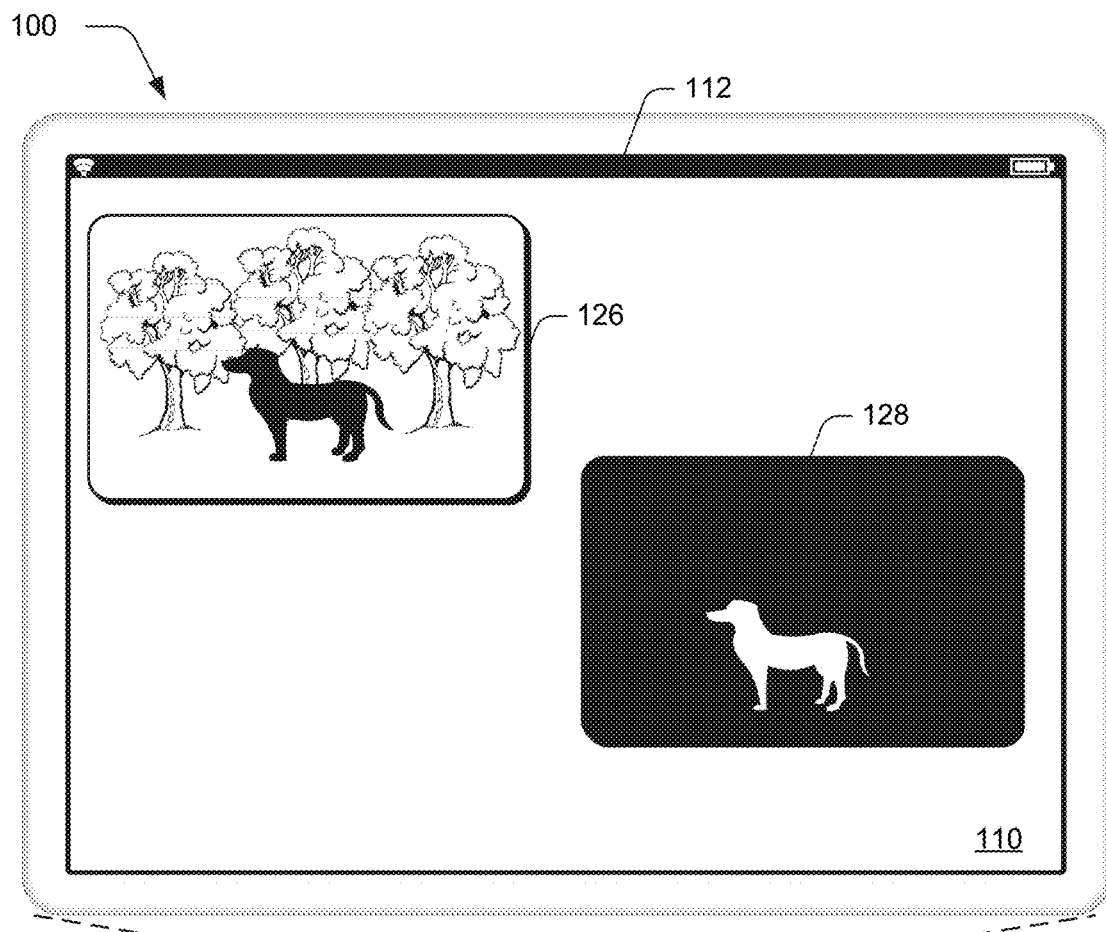
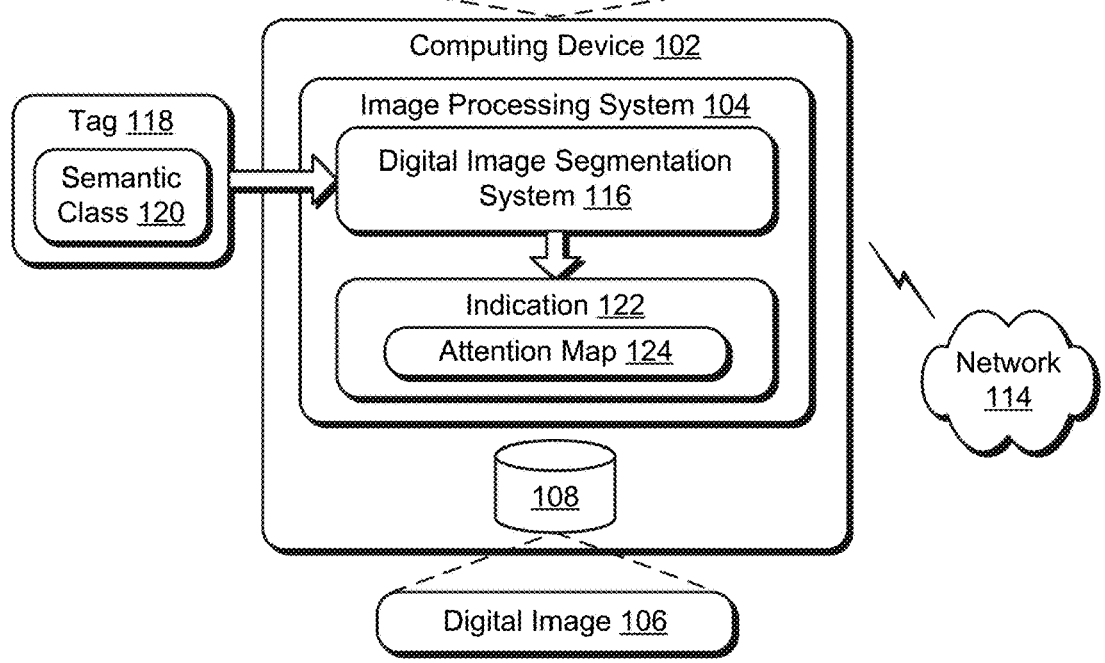
Fig. 1

300

302
Convert a tag into a vector representation, the tag defining a semantic class to be located in a digital image

304
Generate an attention map by an embedding neural network based on the digital image and the vector representation, the attention map defining a location in the digital image that corresponds to the semantic class, the embedding neural network trained using image-level tags

306
Refine the location of the semantic class in the attention map by a refinement neural network of a refinement system, the refinement neural network trained using localized tags

308
Refine the location of the semantic class in the attention map to generate an initial refined location by an initial refinement neural network, the initial refinement neural network trained using localized tags that are localized using respective bounding boxes

310
Refine the initial refined location of the semantic class in the attention map to generate a subsequent refined location by a subsequent refinement neural network, the subsequent refinement neural network trained using localized tags that are localized using respective segmentation masks

312
Indicate the refined location of the semantic class in the digital image using the refined attention map

*Fig. 3*

SEMANTIC CLASS LOCALIZATION DIGITAL ENVIRONMENT

BACKGROUND

Semantic segmentation has achieved great progress with the advancement of neural networks in order to locate portions of a digital image that correspond to a semantic class. A computing device, for instance, may train a neural network using machine learning based on training digital images and tags that identify semantic classes exhibited by the digital images. Semantic classes may be used to identify a particular object included in the digital image, feelings invoked by the digital image, and so forth. The model, once trained, is then configured for use by the computing device to identify a location in the digital image that corresponds to the semantic class.

Conventional techniques, however, require examples of tags and associated digital images for each semantic class to be trained. Therefore, conventional techniques are challenged by a limited availability of training data, which is further exacerbated by a number of tags that may be used to identify the same and similar semantic classes. For example, a conventional model trained using machine learning by a computing device for a semantic concept "human" may fail for a semantic concept "person" due to an inability of the conventional model to recognize relatedness of these two semantic classes to each other.

SUMMARY

Semantic segmentation techniques and systems are described that overcome the challenges of limited availability of training data to describe the potentially millions of tags that may be used to describe semantic classes in digital images. In one example, tags that define semantic concepts exhibited by digital images used to train a neural network are converted to vector representations. The vector representations and corresponding digital images are then used to train neural networks to recognize corresponding semantic concepts.

To do so, the techniques described herein are configured to train neural networks to leverage different types of training datasets using sequential neural networks. In one example, an embedding neural network is first trained by a computing device using a first training dataset. The first training dataset includes digital images and corresponding image-level tags. The embedding neural network, once trained, is configured to generate attention maps that define a coarse location of the tags within the digital images.

A refinement system is then trained by the computing device to refine the attention map, i.e., a location of the semantic class within the digital image. The refinement system, for instance, may include refinement neural networks trained using bounding boxes and segmentation masks that define different levels of accuracy in identifying a semantic class. Once the embedding neural networks and the refinement neural networks of the refinement system are trained, a digital image segmentation system of the computing device may employ these networks sequentially to generate and further refine a location of a semantic class in an input digital image. Further, through use of the vector representations this may also be performed for "new" semantic classes that are not used as a basis to trained the neural network by leveraging similarity of the new semantic classes to the semantic classes that are used to train the networks.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 1 is an illustration of an environment in an example implementation that is operable to employ semantic class localization techniques described herein.

FIG. 3 is a flow diagram depicting a procedure in an example implementation of generation of an attention map by an embedding neural network and refinement of the attention map using a refinement system.

DETAILED DESCRIPTION

Overview

Figure 2:
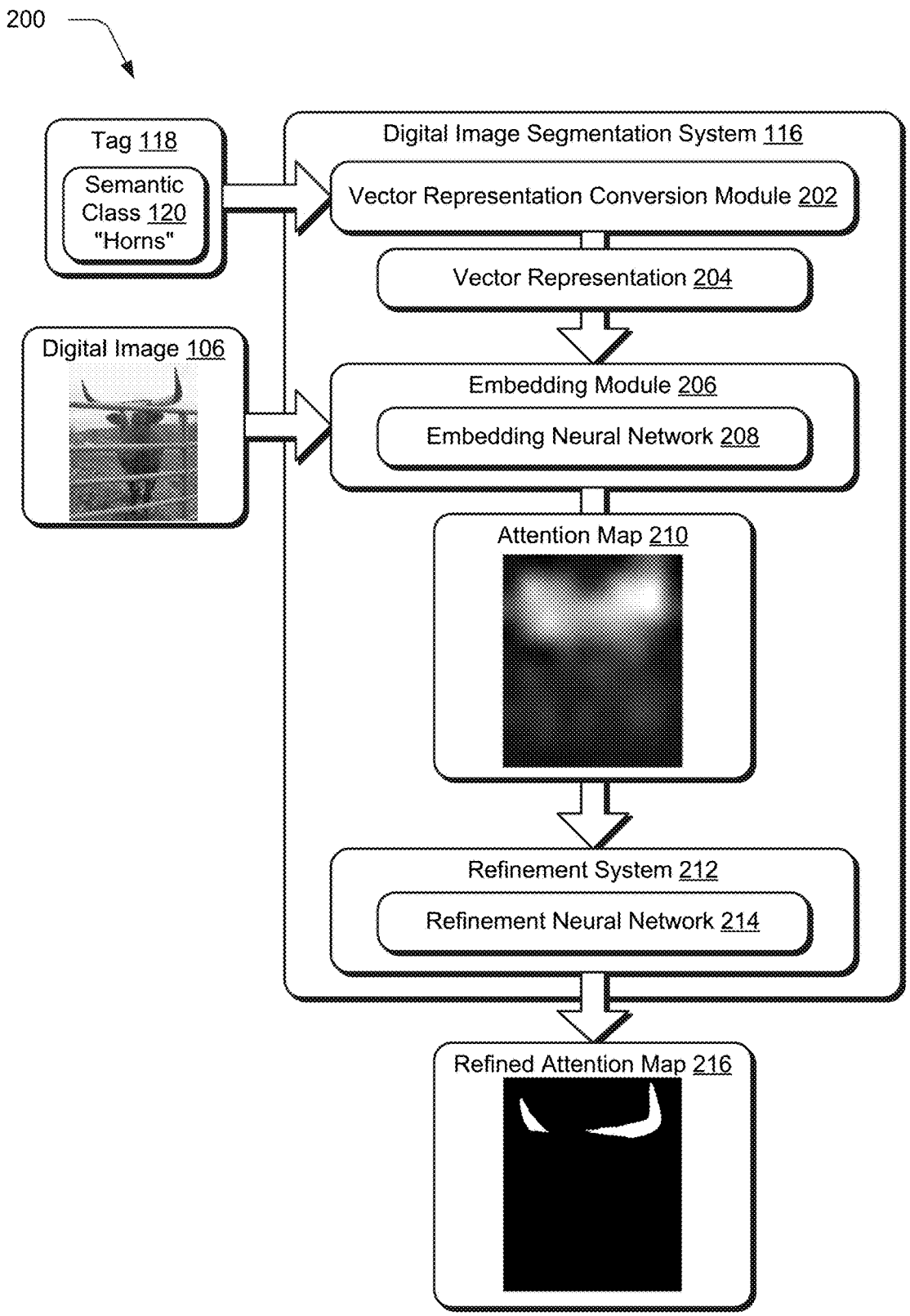
FIG. 2 depicts a system in an example implementation showing operation of a digital image segmentation system of FIG. 1 in greater detail.

Semantic segmentation has achieved great progress with the advancement of neural networks. However, this advancement has been hindered by conventional techniques used to train the neural networks. Conventional semantic segmentation techniques, for instance, are limited to a small number of semantic classes due to complexities caused by overlap of semantic classes and lack of training data.

Tags for semantic classes, for instance, may be thought of as forming branches in a hierarchy that have complex spatial correlations, which may challenge semantic segmentation techniques. For example, for the face of a person, both the fine level annotation of "face" and the higher level annotation of "person" are correct, and for the area of "clothing" on a human body can also be annotated as "person" or "body." This introduces a substantial challenge in training semantic segmentation techniques because of the use of different semantic classes to describe similar and overlapping concepts.

Additionally, as previously described there is a limited availability of training data for use in training neural networks to perform segmentation. This availability is further limited by accuracy in the localization of tags within the digital images included as part of this training. For example, there are fewer items of training data having tags available that define pixel-level localization through use of a segmentation mask than for items of training data having tags that define localization through use of bounding boxes, which is even more limited than for items of training data having image-level tags that do not support localization but rather refer to the digital image as a whole.

Accordingly, semantic segmentation techniques and systems are described that overcome the challenges of limited availability of training data to describe the potentially millions of tags that may be used to describe semantic classes in digital images. In one example, tags that define semantic concepts exhibited by digital images used to train a neural network are converted to vector representations. The vector representations, for instance, may be converted as word embeddings from text of the tags by a model using machine learning, e.g., through use of a two-layer neural network as part of "word2vec." The model is trained to reconstruct linguistic contexts of tags and thus is usable to determine similarity of tags to each other by comparison of the vector representations to determine "how close" these representations are to each other in a vector space.

The vector representations and corresponding digital images are then used to train neural networks to recognize corresponding semantic concepts. As previously described, however, there is a limited availability of training datasets having tags that refer to semantic concepts. This is further limited by the accuracy in localizing the semantic concepts within the digital images, e.g., different amounts of "supervision" from image level to bounding box to segmentations masks.

Accordingly, the techniques described herein are configured to train neural networks to leverage these different types of training datasets using sequential neural networks. In one example, an embedding neural network is first trained by a computing device using a first training dataset. The first training dataset includes digital images and corresponding image-level tags. The embedding neural network, once trained, is configured to generate attention maps that define a coarse location of the tags within the digital images.

A refinement system is then trained by the computing device to refine the attention map, i.e., a location of the semantic class within the digital image. The refinement system, for instance, may include an initial refinement neural network that is trained using localized tags that are localized using respective bounding boxes to generate an initial refined location. The refinement system may also include a subsequent refinement neural network that is trained using localized tags that are localized using respective segmentation masks that localize the semantic class at a pixel-level to generate a subsequent refined location based on the initial refined location.

Once the embedding neural networks and the refinement neural networks of the refinement system are trained, a digital image segmentation system of the computing device may employ these networks sequentially to generate and further refine a location of a semantic class in an input digital image. The neural networks, for instance, may be employed sequentially that are trained from image level to localization from bounding box to pixel level. Further, through use of the vector representations this may also be performed for "new" semantic classes that are not used as a basis to trained the neural network by leveraging similarity of the new semantic classes to the semantic classes that are used to train the networks, which is referred to as "zero shot" learning in the following discussion and is not possible using conventional techniques. In this way, through use of vector representations and sequential refinement of an attention map, a digital image segmentation system may overcome the limitations of conventional systems involving lack of training data to address the millions of potential tags that may be used to describe semantic classes exhibited by digital images. Further, these techniques may be employed jointly through processing of multiple tags at the same time. Further discussion of these and other examples in included in the following sections and shown in corresponding figures.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ semantic class localization techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 9.

The computing device 102 is illustrated as including an image processing system 104. The image processing system 104 is implemented at least partially in hardware of the computing device 102 to process and transform a digital image 106, which is illustrated as maintained in storage 108 of the computing device 102. Such processing includes creation of the digital image 106, modification of the digital image 106, and rendering of the digital image 106 in a user interface 110 for output, e.g., by a display device 112. Although illustrated as implemented locally at the computing device 102, functionality of the image processing system 104 may also be implemented as whole or part via functionality available via the network 114, such as part of a web service or "in the cloud."

An example of functionality incorporated by the image processing system 104 to process the image 106 is illustrated as a digital image segmentation system 116. The digital image segmentation system 116 is implemented at least partially in hardware of the computing device (e.g., through use of a processing system and computer-readable storage medium of FIG. 9) to process the digital image 106 and a tag 118 indicating a semantic class 120 to be identified in the digital image 106. This processing is performed to generate an indication 122 as an attention map 124 that describes "where" the semantic class 120 is located in the digital image 106. The attention map 124, for instance, may be configured to indicate a relative probability at each pixel through use of a grayscale between white ("is" included in the semantic class) and black (e.g., "is not" included in the semantic class). In this way, the attention map 124 may thus act as a heat map to specify a location as to "where" the semantic class 120 is included in the digital image 126 as a segmentation mask 128. This may be used to support a variety of digital image processing as performed by the image processing system 104, including hole filling, object replacement, and other techniques usable to transform the digital image 106 as further described in the following section.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Semantic Class Localization Digital Environment

Figure 4:
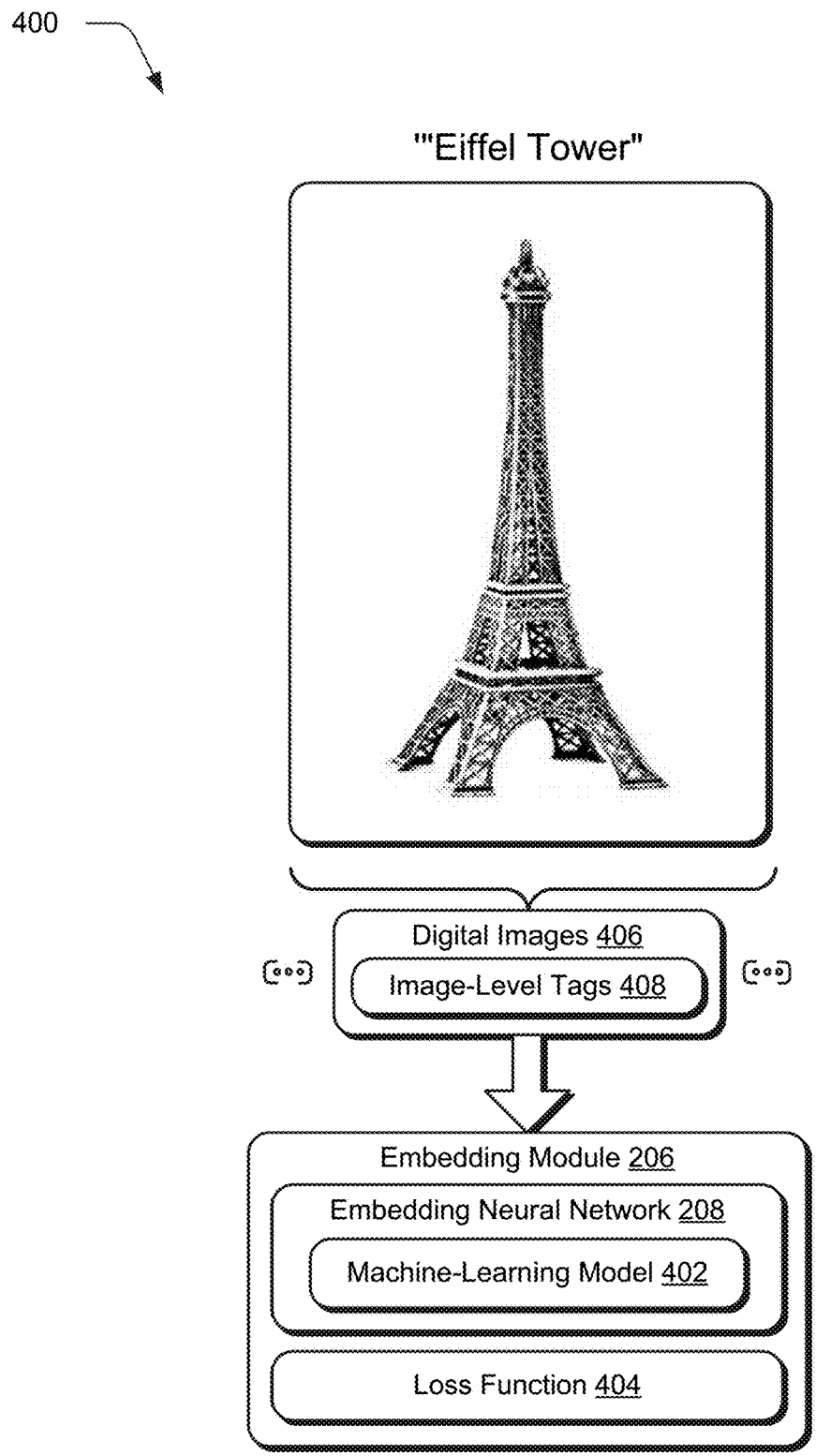
FIG. 4 depicts a system showing an example of training of an embedding neural network of the digital image segmentation system of FIG. 2 for image-level tags.

FIG. 2 depicts a system 200 in an example implementation showing operation of the digital image segmentation system 116 of FIG. 1 in greater detail. FIG. 3 depicts a procedure 300 in an example implementation of generation of an attention map by an embedding neural network and refinement of the attention map using a refinement system. FIG. 4 depicts a system 400 showing an example of training an embedding neural network of the digital image segmentation system 116 of FIG. 2 based on image-level tags.

Figure 5:
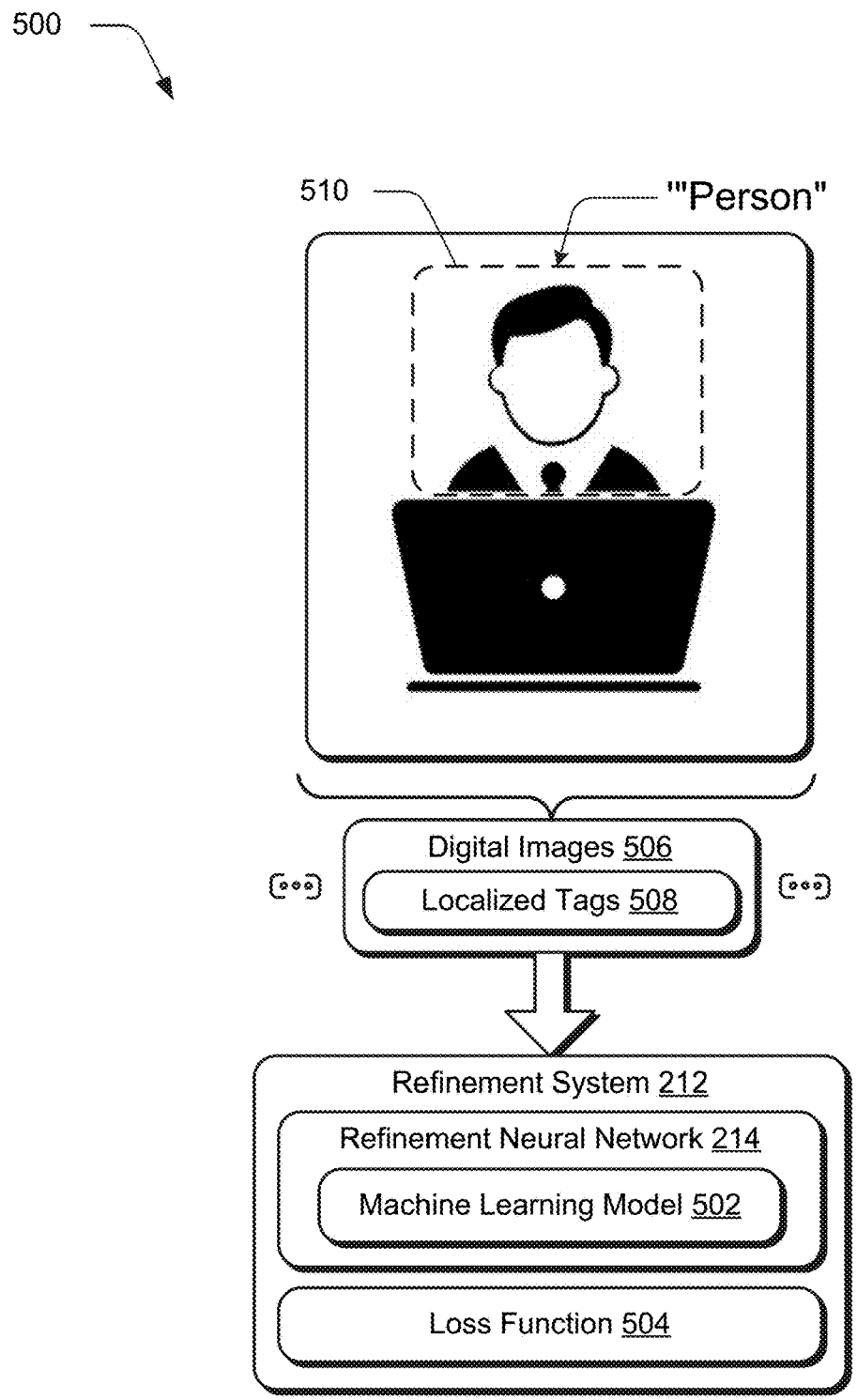
FIG. 5 depicts a system showing an example of training of a refinement neural network of a refinement system of the digital image segmentation system of FIG. 2 using localized tags specifying bounding boxes.
Figure 6:
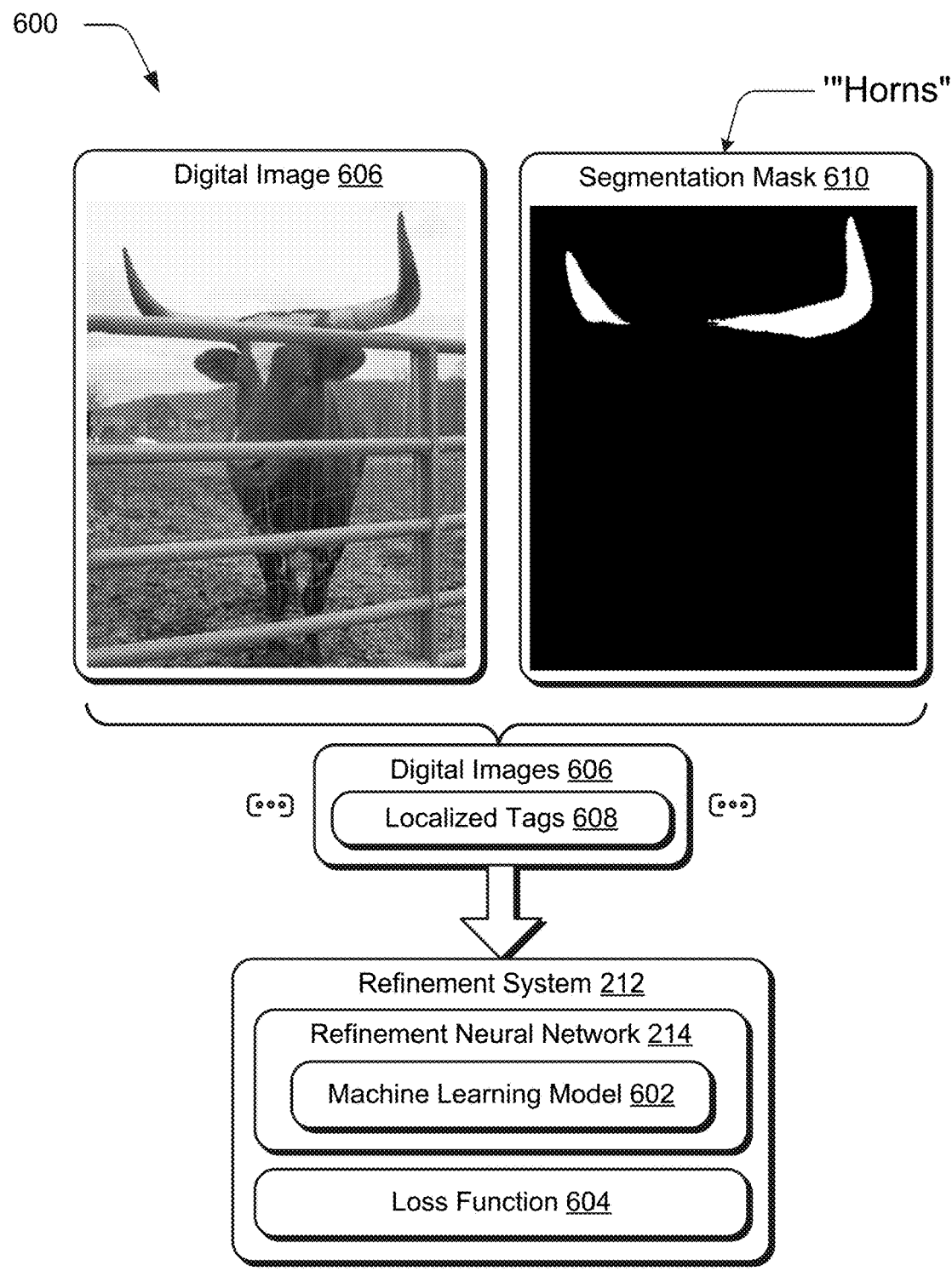
FIG. 6 depicts a system showing an example of training of a refinement neural network of a refinement system of the digital image segmentation system of FIG. 2 using localized tags specifying segmentation masks.
Figure 7:
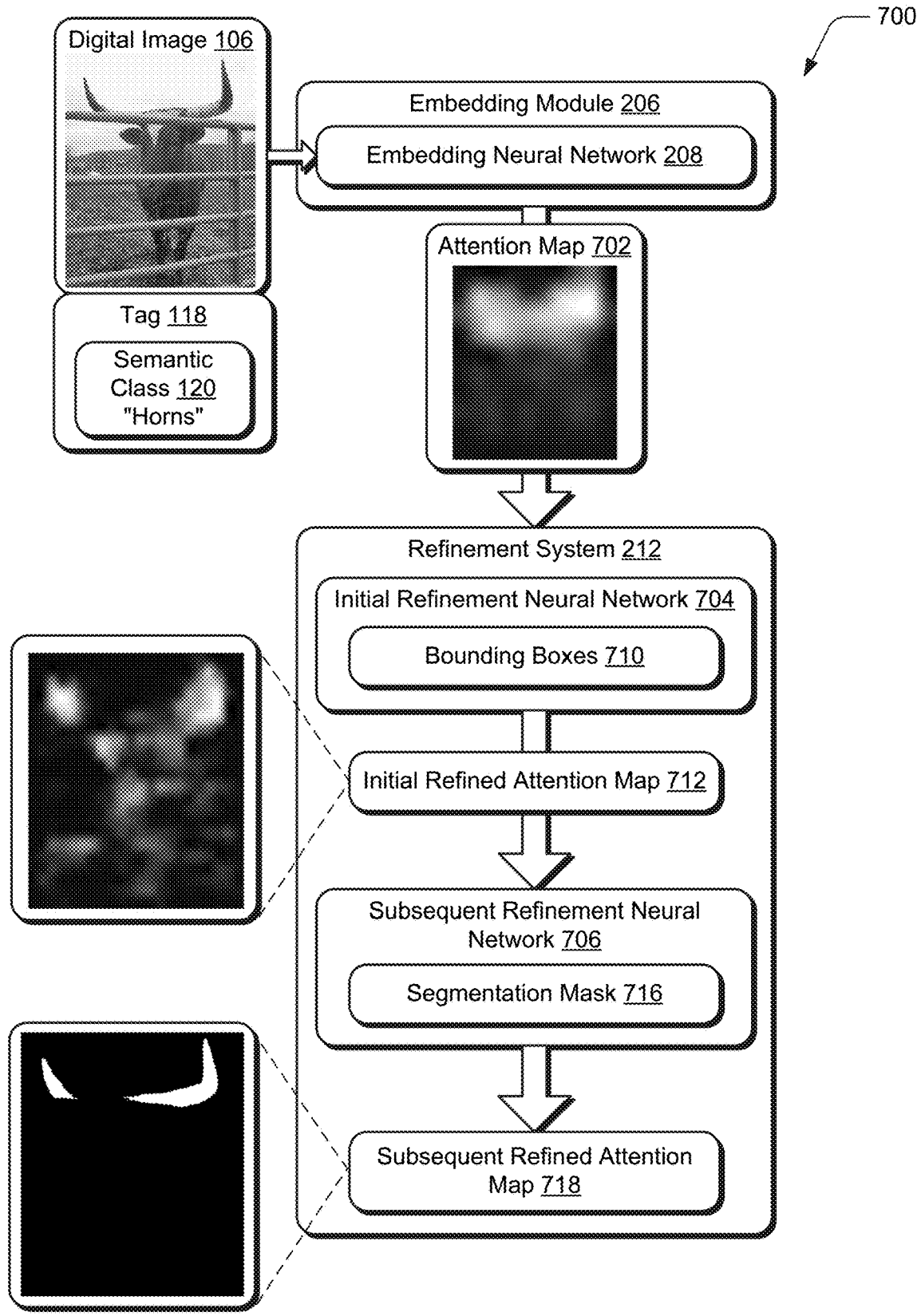
FIG. 7 depicts a system in an example implementation of the refinement system as including refinement neural networks trained on both localized tags defining bounding boxes and localized tags defining segmentation masks for sequential refinement of the attention map of the embedding neural network.

FIG. 5 depicts a system 500 showing an example of training a refinement neural network of a refinement system of the digital image segmentation system 116 of FIG. 2 based on localized tags as a bounding box. FIG. 6 depicts a system 600 showing an example of training of a refinement neural network of a refinement system of the digital image segmentation system 116 of FIG. 2 using localized tags as a segmentation mask. FIG. 7 depicts a system 700 in an example implementation of the refinement system as including refinement neural networks trained on both localized tags defining bounding boxes and localized tags defining segmentation masks for sequential refinement of the attention map of the embedding neural network.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-7.

To begin in this example, an input is received by a digital image segmentation system 116 that includes a tag 118 specifying a semantic class 120 to be located in a digital image 106. The digital image 106 may take a variety of forms, including a single "still" image, a frame of a digital video or animation, and so forth. As previously described, the semantic class 120 specified by the tag 118 may also take a variety of forms, such as to specify an object included in the digital image, a feeling invoked by a user when viewing the digital image, and so forth.

The tag 118 specifying the semantic class 120 (e.g., a dog in the illustrated example) is received by a vector representation conversion module 202. This module is implemented at least partially in hardware of the computing device 102 to convert the tag 118 (i.e., text included in the tag 118 to define the semantic class 120) into a vector representation 204 (block 302). A variety of techniques may be employed by the vector representation conversion module 202 to do so, an example of which is known as "word2vec."

The vector representation conversion module 202, for instance, may be used to generate the vector representation 204 as a word embedding through a group of machine-learning models. The machine-learning models are trained to construct the vector representation 204 (e.g., using two-layer neural networks) to describe a linguistic context of words. To do so, the machine-learning models are trained using a corpus of text to define a vector space of the linguistic context of text in the corpus. The vector representations 204 then describe a corresponding location of the semantic class 120 within that vector space.

Accordingly, vector representations generated using this technique that share common context are located in close proximity to each other in this vector space, e.g., based on Euclidean distance. As a result, tags 118 may be input and processed by the digital image segmentation system 116 that are not used to train the underlying machine-learning models. This is due to an ability to determine similarity of those tags by the digital image segmentation system 116 to the tags that are used to train the models, which is not possible using conventional techniques. Further discussion of this functionality is continued in the Implementation Example section in relation to a "zero shot" learning example.

The vector representation 204 and the digital image 106 are then received by an embedding module 206, e.g., via respective application programming interfaces. The embedding module 206 is configured to employ an embedding neural network 208 to generate an attention map 210 that describes a location of the semantic class 120 specified by the tag 118 in the digital image 106 (block 304). The attention map 210, for instance, may be configured as a heat map to indicate a relative probability at each pixel through use of a grayscale between white (e.g., is included in the semantic class) and black (e.g., is not included in the semantic class). In this way, the attention map 210 specifies a probable location as to where the semantic class 120 is located in the digital image 126. This may be used to support a variety of digital image processing as performed by the image processing system 104, including hole filling, object replacement, semantic class (e.g., object) recognition, and other techniques usable to transform the digital image 106.

As illustrated in the example implementation of FIG. 4, for instance, the embedding module 206 includes an embedding neural network 208 that is configured to train a machine learning model 402 through use of a loss function 404 from digital images 406 and associated image-level tags 408. The image-level tags 408 are not localized to particular locations within the digital images 406, but rather, define semantic classes included in the digital images 406 as a whole. In the illustrated example, for instance, the image-level tag 408 "Eiffel Tower" is used to specify an object included in the digital image 406, but not a location of the object within the image.

As used herein, the term "machine-learning model" 402 refers to a computer representation that can be tuned (e.g., trained) through use of the loss function 404 based on inputs to approximate unknown functions. In particular, the term "machine-learning model" 402 can include a model that utilizes algorithms to learn from, and make predictions on, known data by analyzing the known data to learn to generate outputs that reflect patterns and attributes of the known data based on the loss function 404. Thus, a machine-learning model 402 makes high-level abstractions in data by generating data-driven predictions or decisions from the known input data, i.e., the digital images 406 and image-level tags 408 as a training dataset in this example As shown in FIG. 4, the machine-learning model 402 described herein can be trained using a plurality of digital images 406 that include a variety of different semantic classes. From this, the machine-learning model 402 learns how to identify the semantic classes and a location of pixels that correspond to the semantic classes in order to generate the attention map 210. As such, "training digital images" may be used to refer to digital images that are utilized to train the machine-learning model 402. Additionally, as used herein "training tags" may be used refer to tags that correspond to semantic classes that are used to train the machine-learning model 402.

In practice, digital images 406 having image-level tags 408 are more readily available for training than localized tags. However, the digital images 406 are also available for a larger number of semantic classes than localized tags. In an implementation, the embedding neural network 208 is trained using six million digital images 406 having a corresponding eighteen thousand tags for respective semantic classes. Accordingly, the embedding module 206 may process the digital image 106 and the corresponding tag 118 to generate an attention map 210 that indicates a coarse location of the semantic class 120 (e.g., horns) in the digital image 106 for a multitude of image tags.

The location of the semantic class 120 in the attention map 210 is then refined by a refinement system 212 using a refinement neural network 214 that is trained using localized tags of respective semantic classes (block 306). The localized tags may be configured to a variety of ways to indicate which portion of a digital image corresponds to a semantic class and thus also which portions do not.

As shown in FIG. 5, for instance, the refinement system 212 includes a refinement neural network 214 that is configured to train a machine learning model 502 through use of a loss function 404 from digital images 506 and localized tags 508. The localized tags 508 in this instance are localized through use of a bounding box 510 to identify a location of the semantic class in the digital image 506. The bounding box 510 may be defined as a rectangular area of the digital image that includes the semantic class, but may also include pixels that are not included in the semantic class. In the illustrated example, this permits localization of a person to an area of the digital image 506 that does not include the laptop computer and thus may be used to increase accuracy over image-level tags.

In another instance as illustrated in FIG. 6, the refinement system 212 also includes a refinement neural network 214 that is configured to train a machine learning model 602 through use of a loss function 604 from digital images 606 and localized tags 608. The localized tags 608 in this example, however, are localized at a "pixel level" through use of a segmentation mask 610. Thus, the segmentation mask 610 specifies for each pixel whether that pixel is or is not part of the semantic class, e.g., "Horns" in the illustrated example. As a result, the segmentation mask 610 provides increased accuracy over the bounding box example of FIG. 5.

The segmentation masks 610 used for localized tags 608 provide increased accuracy over localized tags 508 using bounding boxes, which provide increased accuracy of image-level tags 406 in defining a location of a semantic class with respect to a digital image. In practice, however, training datasets for segmentation masks 610 are available for an even fewer number of semantic classes (e.g., eighty semantic classes) than training data sets for bounding boxes 510 (e.g., seven hundred and fifty semantic classes), which is fewer than training datasets for image-level tags 408, e.g., eighteen thousand.

Accordingly, in one example the refinement system is configured to employ both a refinement neural network trained using bounding boxes and a refinement neural network trained using segmentation masks to leverage the different levels of accuracy and availability of semantic tags. As shown in FIG. 7, for instance, the system 700 includes the embedding module 206 and embedding neural network 208 of FIG. 1 and accepts as an input a digital image 106 and a tag 118 specifying a semantic class 120 "horns."

The embedding module 206 then employs the embedding neural network 208 trained using image-level tags to generate an attention map 702 that defines a coarse location of the semantic class 120 within the digital image 106. This location is then refined using the refinement system 212 using an initial refinement neural network 704 and a subsequent refinement neural network 706.

The initial refinement neural network 704 is trained using bounding boxes 710 as described in relation to FIG. 5. The initial refinement neural network 708 is thus trained to refine the location of the semantic class 120 in the attention map 702 to generate an initial refined location as part of an initial refined attention map 712 (block 308).

The initial refined attention map 712 is then passed as an input to a subsequent refinement neural network 706. The subsequent refinement neural network 706 is trained using segmentation masks 716 as described in relation to FIG. 6 that define pixel-level accuracy of localization of semantic classes 120 within digital images 106. The subsequent refinement neural network 706 is thus configured to further refine the initial refined location of the initial refined attention map 712 to a subsequent refined location in a subsequent refined attention map 718 (block 310). Thus, as illustrated the locations of the semantic class 120 "horns" defined within the attention map 702 are further sequentially refined by the initial refined attention map 712 and the subsequent refined attention map 718. Other examples are also contemplated in which either of the initial or subsequent refinement neural networks 704, 706 are used alone to refine the attention map 702 output by the embedding neural network 208.

Regardless of how generated, the refined attention map 216 output by the refinement system 212 may then be used to indicate the refined location of the semantic class in the digital image (block 312). The neural networks, for instance, may be employed sequentially that are trained from image level to localization from bounding box to pixel level. Further, through use of the vector representations this may also be performed for "new" semantic classes that are not used as a basis to train the neural network by leveraging similarity of the new semantic classes to the semantic classes that are used to train the networks, which is referred to as "zero shot" learning in the following Implementation Example and is not possible using conventional techniques. In this way, through use of vector representations and sequential refinement of an attention map, a digital image segmentation system may overcome the limitations of conventional systems involving lack of training data to address the millions of potential tags that may be used to describe semantic classes exhibited by digital images. Further discussion of this and other examples is included in the following Implementation Example section.

Implementation Example

As previously described, the semantic class localization techniques leverage different datasets having different levels of supervision to train respective neural networks. A first training dataset, for instance, may include six million digital images with eighteen thousand tags of different semantic classes. A second training dataset is configured based on localized tags as bounding boxes for seven hundred and fifty different semantic classes. A third training dataset is configured based on localized tags as segmentation masks for eighty different semantic classes.

Given these datasets, a semi-supervised training technique is employed by the digital image segmentation system 116 as an incremental learning framework. This framework includes three steps. First, a deep neural network is trained on the first dataset describe above to learn large-scale visual-semantic embedding between digital images and eighteen thousand semantic classes. By running the embedding network in a fully convolutional manner, a coarse attention (heat) map may be computed for any given semantic class.

Next, two fully connected layers are attached to the embedding neural network as the initial refinement neural network 704 of the refinement system 212. This neural network is then trained in low resolution using the seven hundred and fifty semantic class second dataset with bounding box annotations to refine the attention maps. In an implementation, multitask training is used to learn from the second dataset without having an affect on the previously learned knowledge from the first dataset.

Lastly, the subsequent refinement neural network 706 is trained as a label-agnostic segmentation neural network which takes the initial refined attention map 712 and original digital image 106 as input and predicts a high-resolution segmentation mask as the subsequent refined attention map 718 without significant knowledge of the semantic class 120 of interest. The segmentation network is trained with pixel-level supervision on eighty concepts of the third dataset, but can generalize to the attention map computed for any semantic concept.

As shown in FIG. 7, the overall framework of the large-scale segmentation system implemented by the digital image segmentation system 116 includes an embedding module 206 having an embedding neural network 208 that generates an attention map 702 from the digital image 106 and the semantic class 120 specified by the tag 118. The refinement system 212 includes an initial refinement neural network 704 that generates the initial refined attention map 712 as a "low resolution attention map" which is then refined by the subsequent refinement neural network 706 to generate a subsequent refined attention map 718 as a segmentation mask, e.g., at a pixel-level.

Embedding Neural Network 208

The embedding neural network 208 is trained with the first training dataset having image-level tags to learn large-scale visual-semantic embedding. The first dataset has six million images, each with annotated tags from a collection of eighteen thousand semantic classes. The first training set is denoted as D={(I, (w$_1$, w$_2$, ..., w$_n$)}, where I is an image and w$_i$ is the word vector representation of its associated ground-truth tags.

Pointwise mutual information (PMI) is used to generate the word vector representations for each tag w in the vocabulary. PMI is a measure of association used in information theory and statistics. In particular, the PMI matrix M is calculated, in which the (i, j)-th element is:

$$M_{ij} = PMI(w_i, w_j) = \log\frac{p(w_i, w_j)}{p(w_i)p(w_j)},$$

where p(w$_i$, w$_j$) denotes the co-occurrence probability between w$_i$ and w$_j$, and p(w$_i$) and p(w$_j$) denote occurrence frequency of w$_i$ and w$_j$, respectively. Matrix M is of size V×V, where V is size of tag vocabulary $\mathbb{W}$. The value M accounts for the co-occurrences of tags in the training corpus. Eigen vector decomposition is then applied to decompose the matrix M as M=USU$^T$. Let W=US$^{1/2}$, then each row of the column-truncated submatrix W$_{:,1:D}$ is used as the word vector for the corresponding tag.

Since each image is associated with multiple tags, in order to obtain a single vector representation of each, a weighted average is calculated over each of the associated tags. t=$\Sigma_{i=1}^n$ α$_i$w$_i$ where α=−log(p(w$_i$)) is the inverse document frequency (idf) of the word w$_i$. The weighted average is referred to as soft topic embedding.

The embedding neural network 208 is learned to map the image representation and the vector representation of its associated tags into a common embedding space. In one example, each image I is passed through a CNN feature extractor, e.g., a ResNet-50 extractor. After global average pooling (GAP), the visual feature from the digital image 106 is then fed into a 3-layer fully connected network, with each fully connected layer followed by a batch normalization layer and a ReLU layer. The output is the visual embedding e=embd_net(I), and is align with the soft topic word vector t by a cosine similarity loss as follows:

$$L_{embed}(e, t) = 1 - \langle e, t \rangle = 1 - \frac{e^T t}{\|e\|\|t\|}$$

After the embedding neural network 208 is trained, the global average pooling layer is removed to obtain the attention map for a given semantic class, thereby transforming the network to a fully-convolutional network. This is performed by converting the fully connected weights to 1×1 convolution kernels and the batch normalization layers to spatial batch normalization layers. After this transformation, a dense embedding map may be obtained given a digital image 106 and a vector representation 204, in which the value at each location is the similarity between the semantic class 120 and the image region around that location. Thus the embedding map is also referred to as an attention map for that word.

Formally, the attention map for a given semantic class w can be calculated as:

Att$_{(i,j)}$=<e$_{i,j}$,w> where (i,j) is the location index for the attention map.

For an unseen semantic class that is not used in as part of image-word embedding training, as long as it is possible to generate the vector representation (i.e., word vector) w, it is still possible to obtain its attention map using the above equation. Therefore, the embedding neural network 208 can be generalized to any arbitrary semantic class, which is not possible using conventional techniques.

Although the embedding network trained on image level annotation is able to predict an attention map for large scale concepts, the resultant attention map is still coarse due to the lack of annotations with spatial information.

Refinement System 212

In order to improve the quality of the attention map 210, the refinement system 212 is employed to leverage finer-level tags, namely the object bounding box tag that are available in in the second dataset, e.g., using seven hundred and fifty semantic classes as part of a curated OIVG-750 dataset.

The refinement neural network 214 is appended at the end of the embedding neural network 208, and includes two convolutional layers with 1×1 kernels followed by a sigmoid layer. By treating the eighteen thousand word embeddings as convolutional kernels, the embedding neural network 208 can output eighteen thousand coarse attention maps 210. The two-layer refinement neural network 214 of the refinement system 212 then takes those eighteen thousand coarse attention maps as input, and learns a non-linear combination of the concepts to generate refined attention maps 216 for the seven hundred and fifty semantic classes. Thus, the refinement neural network 214 takes the relationship between different semantic classes into consideration during its training.

For a given semantic class, a training signal for its attention map is a binary mask based on the ground-truth bounding boxes, and a sigmoid cross entropy loss is used. The embedding neural network 208 is also finetuned for better performance. However, since the bounding box tag are limited to a fewer number of semantic classes (e.g., 750) in this example, the refinement neural network 214 is trained solely on those classes. In order to preserve the learned knowledge from the rest of eighteen thousand semantic classes, an additional matching loss is added. For example, the attention maps 210 generated by the embedding neural network 208 are thresholded into binary masks and a sigmoid cross entropy loss is exerted for the refined attention maps 216 to match the attention maps 210 from the embedding module 206. The multi-task loss function is therefore as follows:

$$L = L_{xe}(GT, Att) + \alpha \sum_{j \in \Psi_N} L_{xe}(B(\text{Att\_ori}_j), Att_j)$$

where $L_{xe}$ (p, q) is the cross entropy loss between distributions p and q. Att is the attention map of the given concept, GT is the ground truth mask. B (Att) is the binary mask after thresholding the attention map. $\text{Att\_ori}_j$ and $Att_j$ are original attention map and refined attention map respectively. $\psi_N$ is the set of indices of top N activated original attention maps. Thus, matching loss is exerted on attention maps with high activation only. a is the weight balancing the losses. In one example, the value N=800, and $\alpha=10^{-6}$.

In an implementation, sigmoid cross entropy loss is used during training instead of softmax loss as in semantic segmentation to address semantic classes having masks that overlap each other, which is especially common for objects and their parts. For example, the mask of face is always covered by the mask of person. Using softmax loss therefore would discourage the mask predictions on those concepts one way or another. At the same time, there are still many cases where the masks of two semantic classes never overlap. To utilize such information and make training of the attention maps more discriminative, an auxiliary loss is added for those non-overlapping concepts to discourage high responses for both concepts occurring at the same time.

In particular, the mask overlap ratio is calculated between every co-occurred concept pair in the training data as follows:

$$O(i, j) = \frac{\sum_n O_n(i, j)}{\sum_n a_n(i)}$$

where $a_n$ (i) is the mask of the i-th concept in image n, and o (•,•) is the overlapping area of between two concepts. Note that the mask overlap ratio is non-symmetric.

With the overlap ratio matrix, a training example of a concept i can serve as a negative training example of its non-overlapping concept j, i.e., for a particular location in the image, the output for concept j should be 0 if the ground-truth for concept i is 1. To soften the constraint, the auxiliary loss is further weighted based on the overlap ratio, where the weight γ is calculated as:

$$\gamma = \begin{cases} 1 - O(i, j), & \text{if } O(i, j) < 0.5 \\ 0, & \text{otherwise} \end{cases}$$

The refinement system 212 now can predict low resolution attention map for an arbitrary concept using its vector representation 204. To further obtain the mask of the concept with higher resolution and better boundary quality, a label agnostic segmentation network is trained as the subsequent refinement neural network 706 that takes the original digital image 106 and the attention map as input, and generates segmentation mask without knowing the semantic class 120. Since the subsequent refinement neural network 706 is configured to generate a segmentation mask given the prior knowledge of initial refined attention 712, the segmentation network can generalize to unseen concepts, even though it is entirely trained on the third training dataset having eighty semantic classes in this example.

To segment the masks for the concepts at different scales, multiple attention maps are generated by feeding the embedding neural network 208 with different input image sizes, e.g., 300 and 700 pixel dimensions. The resultant attention maps are then upsampled to serve as the extra input channel to the refinement system 212 along with the digital image 106.

To focus the refinement system 212 on generating accurate masks instead of having the extra burden of predicting the existence of the concept in the image, the attention maps may be normalized to [0,1] to increase computational efficiency. That means, the semantic class of interest is assumed to appear in the digital image during the third stage training of the subsequent refinement neural network 706, which leads to segmentation networks having increased accuracy.

Figure 8:
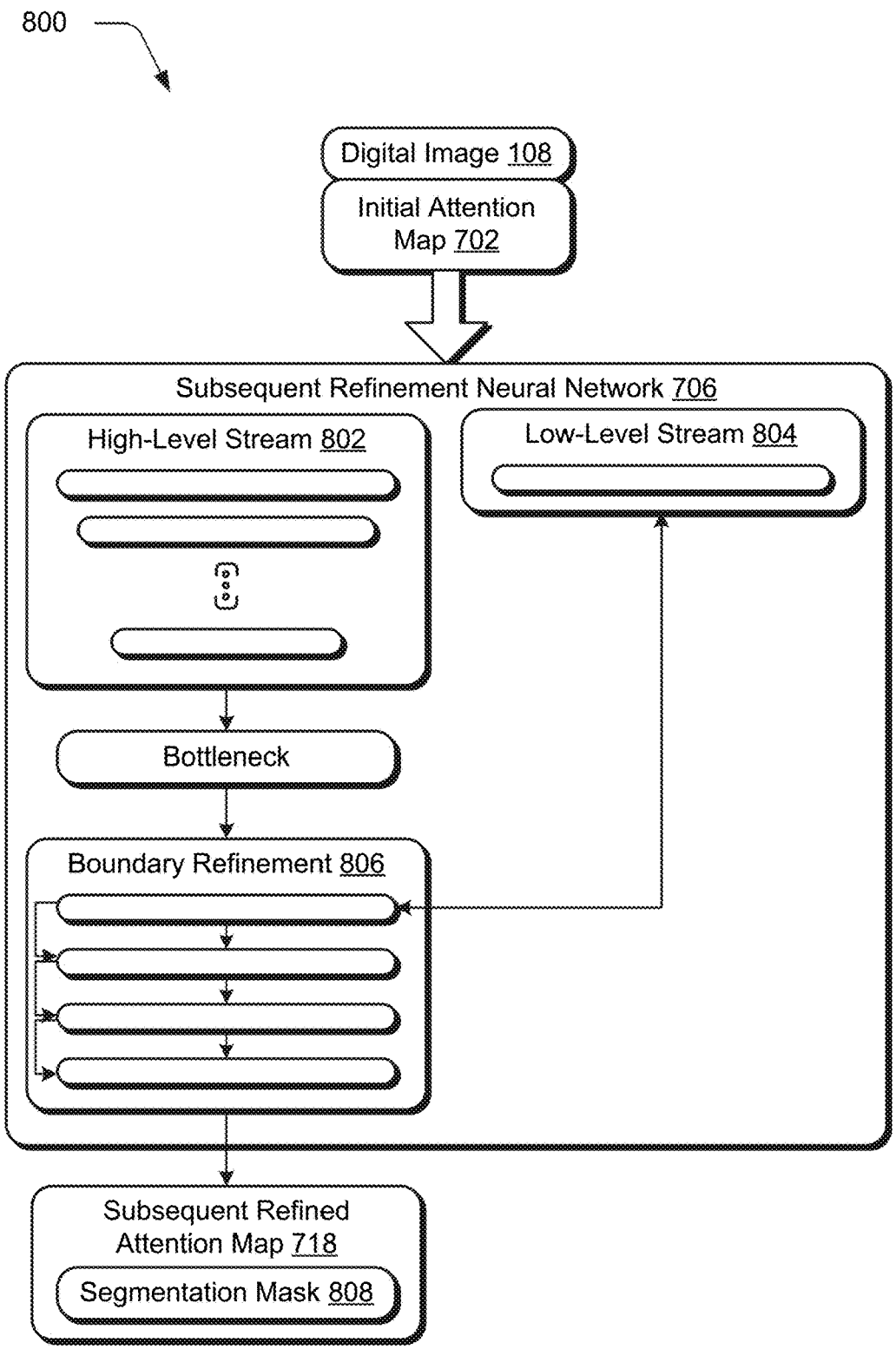
FIG. 8 depicts an example architecture of a subsequent refinement neural network of FIG. 7 as a segmentation network.

FIG. 8 depicts an example architecture 800 of the subsequent refinement neural network 706 as a segmentation network. The example architecture 800 has a Y-shape and includes three parts: a high-level stream 802 that uses traditional encoder network to extract visual features, generating a two-channel low resolution feature map as output; a low-level stream 804 that extracts full resolution multi-channel feature maps by a shallow network module; and a boundary refinement 806 module that combines the high-level and low-level features to generate a full resolution segmentation mask 808 as the subsequent refined attention map 718. The boundary refinement 806 module concatenates the output of the low-level and high-level streams and passes it to several densely connected units, in which the output of each dense unit is part of the input to any other dense unit.

The high-level stream 802 may be implemented as a deep CNN encoder network, except the input to the network has two extra channels of attention map obtained in the attention network, e.g., one from input image size 300×300, one from size 700×700. For the segmentation model, a version of the Inception-V2 may be used in which the last three layers are removed, i.e., pool, linear and softmax. The input is a 244×244 5-channel digital image 108 plus initial attention map 702 and the output of the truncated Inceptions-V2 is a 7×7 1024-channel feature map. To get a 14×14 feature map, a dilated convolution is used for the last two inception modules. Finally, a convolution layer is added to generate the 2-channel 14×14 feature map.

The low-level stream 804 is implemented as a shallow network. The input to the shallow network is a 3-channel digital image 108 and two extra channels of the initial attention map 702. Specifically, a single 7×7 convolution layer may be used with stride of 1. The output of this stream is a 64-channel 224×224 feature map.

The boundary refinement 806 module takes the low-level and high-level feature as input and outputs the final result as a segmentation mask 808. More specifically, the high-level feature map is resized to the original resolution (224×224 in our case) by bilinear upsampling. Then, the upsampled high-level feature map is concatenated with the low-level feature map and then passed to the densely connected layer units. Each dense unit is includes convolutional layers, and the output is concatenated with the input to the unit. This densely connected structure allows more effective training for enhancing boundary quality.

Zero Shot Learning

As previously described, eighteen thousand semantic classes are trained, only, on the embedding neural network 208 with image level supervision through use of image-level tags 408. However, the refinement system 212 is trained using localized tags 608, e.g., at a bound box level or segmentation mask (pixel) level. Thus, the discrepancy between the lower-quality attention maps of the embedding neural network 208 and the higher-quality attention maps of the refinement system 212 (e.g., 750 semantic classes) may impact segmentation performance on the eighteen thousand semantic classes.

Therefore, for a semantic class q from the eighteen thousand semantic classes with only image level supervision, its nearest neighbor concept p is found in an embedding space from semantic classes used to train the refinement neural network 214, e.g., 750 semantic classes. A linear combination of the attention maps from the two concepts is then used as the input attention map 210 to the refinement system 212.

$$Att = \theta Att_q + (1-\theta) Att_p$$

where θ is decided on validation set.

For zero-shot learning, the embedding and attention map of the semantic class is obtained as described above. To predict segmentation for the semantic class, the same technique is used, using linear combination of attention maps of the semantic class and its nearest neighbor for the refinement system 212. In this way, the digital image segmentation system 116 may address semantic classes even if those classes were not used to train the neural networks of the system, which is not possible using conventional techniques.

Example System and Device

Figure 9:
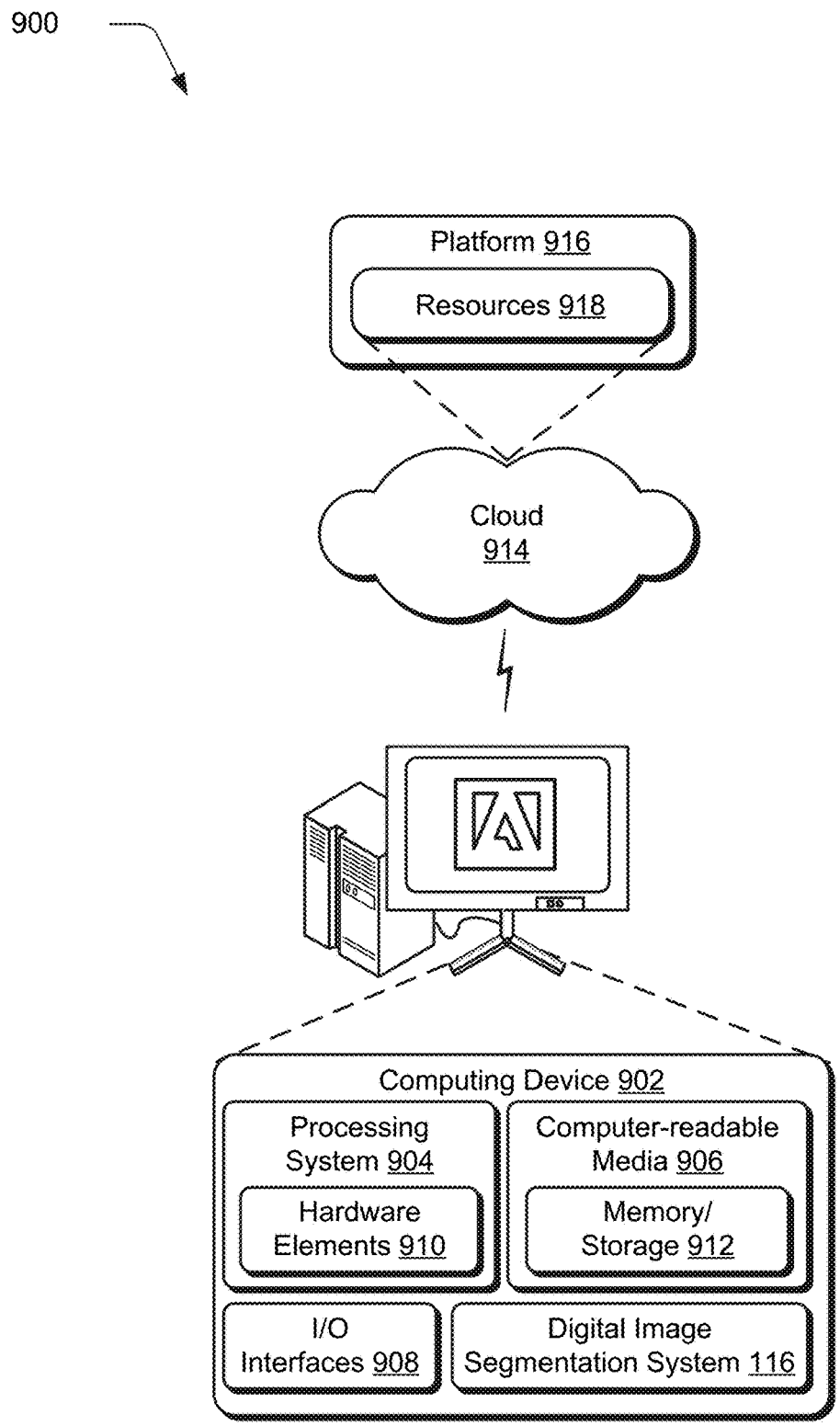
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the digital image segmentation system 116. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium semantic class localization environment, a method implemented by a least one computing device, the method comprising:
    converting, by the at least one computing device, a tag into a vector representation, the tag defining a semantic class to be located in a digital image;
    generating, by the at least one computing device, an attention map by an embedding neural network based on the digital image and the vector representation, the attention map defining a location in the digital image that corresponds to the semantic class, the embedding neural network trained using image-level tags of respective semantic classes;
    refining, by the at least one computing device, the location of the semantic class in the attention map by a refinement neural network, the refinement neural network trained using localized tags of respective semantic classes; and
    indicating, by the at least one computing device, the refined location of the semantic class in the digital image using the refined attention map.

2. The method as described in claim 1, wherein the converting of the vector representation uses an embedding neural network as part of machine learning.

3. The method as described in claim 1, wherein the image-level tags indicate respective semantic classes that are associated with respective digital images as a whole that are used to train the embedding neural network.

4. The method as described in claim 1, wherein the image-level tags are not localized to respective portions of digital images that are used to train the embedding neural network.

5. The method as described in claim 1, wherein the localized tags of the semantic classes are localized to respective portions of digital images used to train the refinement neural network using respective bounding boxes.

6. The method as described in claim 1, wherein the localized tags of the semantic classes are localized to respective portions of digital images used to train the refinement neural network using respective segmentation masks.

7. The method as described in claim 1, wherein a number of semantic classes used to train the refinement neural network is less than a number of semantic classes used to train the embedding neural network.

8. The method as described in claim 1, wherein the refining by the refinement neural network includes:
    refining the location of the semantic class in the attention map to generate an initial refined location by an initial refinement neural network, the initial refinement neural network trained using localized tags that are localized using respective bounding boxes; and
    refining the initial refined location of the semantic class to generate a subsequent refined location by a subsequent refinement neural network, the subsequent refinement neural network trained using localized tags that are localized using respective segmentation masks, and wherein the indicating is based on the subsequent refined location.

9. The method as described in claim 1, wherein the tag defining the semantic class to be located in the digital image is not one of the image-level tags used to train the embedding neural network and is not one of the localized tags used to train the refinement neural network.

10. The method as described in claim 1, wherein the converting is performed for first and second said tags and the generating, the refining, and the indicating are performed jointly based on the first and second tags.

11. In a digital medium semantic class localization environment, a system comprising:
    at least one processor;
    at least one memory storing instructions configured to cause the at least one processor to:
    convert a tag into a vector representation, the tag defining a semantic class to be located in a digital image;
    implement an embedding neural network to generate an attention map based on the digital image and the vector representation, the attention map defining a location in the digital image that corresponds to the semantic class, the embedding neural network trained using image-level tags of respective semantic classes; and
    implement a refinement neural network to refine the location of the semantic class in the attention map, the refinement neural network trained using localized tags of semantic classes.

12. The system as described in claim 11, wherein the image-level tags indicate respective semantic classes are associated with respective digital images as a whole that are used to train the embedding neural network and are not localized to respective portions of the digital images.

13. The system as described in claim 11, wherein the localized tags of the semantic classes are localized to respective portions of digital images used to train the refinement neural network using respective bounding boxes.

14. The system as described in claim 11, wherein the localized tags of the semantic classes are localized to respective portions of digital images used to train the refinement neural network using respective segmentation masks.

15. The system as described in claim 11, wherein the instructions are configured to cause the at least one processor to:
    refine the location of the semantic class in the attention map to an initial refined location by an initial refinement neural network, the initial refinement neural network trained using localized tags of semantic classes that are localized using respective bounding boxes; and
    refine the initial refined location of the semantic class to generate a subsequent refined location by a subsequent refinement neural network, the subsequent refinement neural network trained using localized that are localized using respective segmentation masks.

16. The system as described in claim 11, wherein the tag defining the semantic class to be located in the digital image is not one of the image-level tags used to train the embedding neural network and is not one of the localized tags used to train the refinement neural network.

17. In a digital medium semantic class localization environment, a method implemented by a least one computing device, the method comprising:
    converting, using a processor of the computing device, a tag defining a semantic class to be located in a digital image into a vector representation;
    generating an attention map by an embedding network as part of machine learning based on the digital image and the vector representation, the attention map defining a location in the digital image that correspond to the semantic class, the embedding network trained using image-level tags of respective semantic classes;
    refining the location of the semantic class in the attention map to an initial refined location by an initial refinement neural network, the initial refinement neural network trained using localized tags of semantic classes that are localized using respective bounding boxes; and refining the initial refined location of the semantic class to a subsequent refined location by a subsequent refinement neural network, the subsequent refinement neural network trained using localized tags of semantic classes that are localized using respective segmentation masks.

18. The system as described in claim 17, wherein the image-level tags indicate respective semantic classes that are associated with respective digital images as a whole that are used to train the embedding neural network and are not localized to respective portions of the digital images.

19. The system as described in claim 17, wherein the respective segmentation masks are pixel-level segmentation masks.

20. The system as described in claim 17, wherein:

a number of the localized tags used to train the subsequent refinement neural network is less than a number of the localized tags used to train the initial refinement neural network; and the number of the localized tags used to train the initial refinement neural network is less than a number of the image-level tags used to train the embedding neural network.

\* \* \* \* \*